(12) United States Patent
McMahon

(10) Patent No.: US 12,281,718 B2
(45) Date of Patent: Apr. 22, 2025

(54) VALVE-ACTUATOR INTERFACE TO SIMPLIFY VALVE REPAIR AND MAINTENANCE

(71) Applicant: Thomas McMahon, Croton-on-Hudson, NY (US)

(72) Inventor: Thomas McMahon, Croton-on-Hudson, NY (US)

( * ) Notice: Subject to any disclaimer, the term of this patent is extended or adjusted under 35 U.S.C. 154(b) by 0 days.

(21) Appl. No.: 18/811,053

(22) Filed: Aug. 21, 2024

(65) Prior Publication Data

US 2025/0035229 A1 Jan. 30, 2025

Related U.S. Application Data

(62) Division of application No. 18/214,194, filed on Jun. 26, 2023, now Pat. No. 12,078,260.

(60) Provisional application No. 63/430,529, filed on Dec. 6, 2022.

(51) Int. Cl.
*F16K 27/12* (2006.01)
*F16K 31/04* (2006.01)
*F16K 41/02* (2006.01)

(52) U.S. Cl.
CPC ............ *F16K 31/043* (2013.01); *F16K 27/12* (2013.01); *F16K 41/02* (2013.01)

(58) Field of Classification Search
CPC .......................... F16K 27/12; F16K 41/02–086
USPC ........................................................ 251/293
See application file for complete search history.

(56) References Cited

U.S. PATENT DOCUMENTS

| | | | | | |
|---|---|---|---|---|---|
| 1,606,715 | A | * | 11/1926 | Miller | F16K 27/12 137/382 |
| 1,975,030 | A | * | 9/1934 | Wheelhouse | F16K 41/04 251/219 |
| 2,954,797 | A | * | 10/1960 | Dryer | G01M 3/02 251/293 |
| 4,903,719 | A | * | 2/1990 | Rains | F16K 27/12 137/382.5 |
| 4,972,867 | A | * | 11/1990 | Ruesch | F16K 37/00 137/15.17 |
| 4,995,420 | A | * | 2/1991 | Wiggins | F16K 31/46 251/293 |
| 6,257,551 | B1 | * | 7/2001 | Veiga | F16K 31/46 251/293 |
| 7,021,327 | B2 | * | 4/2006 | Creel | E03B 9/04 251/293 |
| 2007/0108402 | A1 | * | 5/2007 | Davis | F16K 31/041 251/293 |
| 2012/0119131 | A1 | * | 5/2012 | Strebe | F16K 31/04 251/356 |
| 2024/0263716 | A1 | * | 8/2024 | Harrod | F16K 11/08 |

* cited by examiner

*Primary Examiner* — Umashankar Venkatesan

(57) ABSTRACT

An adapter connects to a mechanical interface of valve on one side of the adapter and connects to an actuator mechanical interface of a valve actuator on another side of the adapter. A transmission element in the housing of the adapter transmits an actuator force developed by the valve actuator to the valve via the valve mechanical interface. The valve mechanical interface on the adapter fluidically seals to a leaking portion of the valve. Consequently, in a system in which a valve is leaking, rather than replacing or repairing the valve, the adapter may simply be interposed between the valve and the valve actuator.

11 Claims, 12 Drawing Sheets

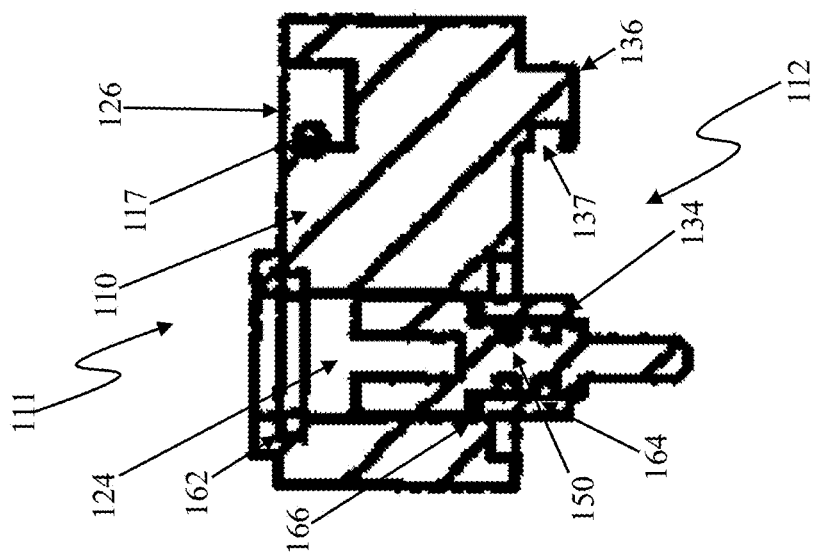
Fig. 8
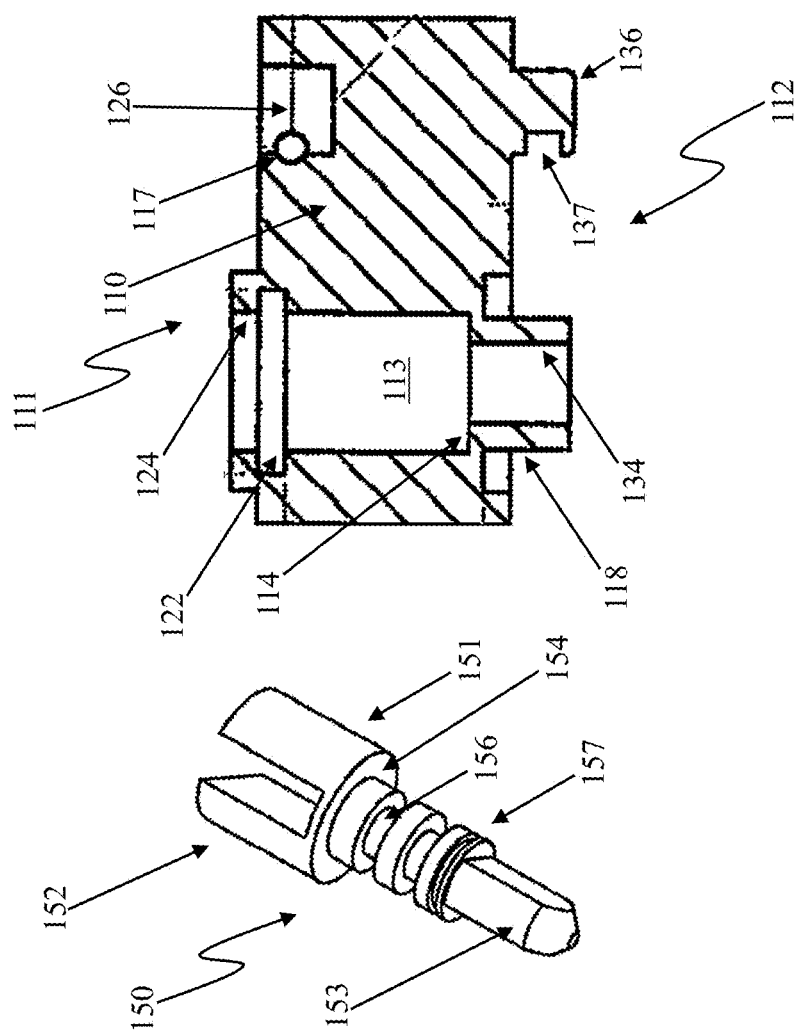
Fig. 7
Fig. 6

VALVE-ACTUATOR INTERFACE TO SIMPLIFY VALVE REPAIR AND MAINTENANCE

CROSS-REFERENCE TO RELATED APPLICATIONS

This application is a divisional application of U.S. application Ser. No. 18/214,194, which claims the benefit of U.S. provisional application No. 63/430,529, filed Dec. 6, 2022, the contents of both of which are incorporated herein by reference.

FIELD OF THE INVENTION

The present disclosure relates to the field of actuated fluidic control systems, and more particularly to methods and devices to provide repair and maintenance with respect to leaks that may develop during the use of such systems.

BACKGROUND

Electrically actuated valves, such as zone valves in hydronic systems, are widely deployed in residential, commercial, and industrial settings. Such systems will often employ a plurality of valves, in which an actuator controls each valve. The actuator, which is co-located outside the valve, may drive a rotational valve shaft, opening or shutting the valve when actuated. A known problem with such systems is that the valve may exhibit a failure mode in which the seal of the valve shaft begins leaking, necessitating replacement of parts internal to the valve. Fixing the valve in this manner requires removing the actuator from the valve, which is typically relatively easy, but then further requires disassembly of the valve itself, which may be difficult and time-intensive since valves are frequently located in inconvenient locations and the underlying fluidic system must be depressurized, drained, and refilled in order to conduct the repair. Such servicing complexities are exacerbated in winter months with respect to heating systems, for which failure modes are typically discovered as the systems are being returned to service, and the servicing of which disrupts heating during times of real need.

Accordingly, there exists a need to simplify the service of installed valve/actuator sub-systems that are prone to develop leaking valves.

BRIEF SUMMARY

In one embodiment, the present invention seeks to overcome the stated problem by providing an adapter that can be easily installed to avoid the need for repair measures that would expose internal valve parts or compromise operating fluids or conditions. The adapter is designed to be simply inserted between the valve and the actuator, and upon reassembly with the adapter in place, provide a further seal to repair the failed seal, and extend the input of the actuator through the adapter so that the actuator, operating now through the adapter, may continue to operate the valve in its usual manner.

In one embodiment, the adapter provides, interior to the connection that it creates between the valve body and the actuator, a transmission element, one end of which is fashioned to be directed, upon insertion of the adapter, proximal to the valve body, and engage with the actuation input of the valve (i.e., the slot or other interface that originally accepted the mechanical input from the actuator). The distal end of the transmission element is likewise fashioned to engage with the actuator, upon reassembly of the system with the adapter in place. The adapter incorporates its own seal for the transmission element, in the body of the adapter. The adapter with its internal transmission element operates to extend the actuation input through the adapter and transmit the actuation force from the actuator through the transmission element, to the actuation input, which thereby allows the actuator to continue to operate in its usual manner, while the seal provided in the adapter supplements (or takes the place of) the failing/failed original seal of the valve control mechanism.

The adapter assembly may be inserted between the valve and the actuator in a manner that securely holds the actuator and adapter to the valve body, and keeps the actuator's drive element, the adapter's transmission element, and the control input of the valve, in mutual engagement, with the valve-facing interface of the adapter securely attachable to the valve body, and the actuator-facing surface of the adapter securely attachable to the valve-facing surface of the actuator.

It is a benefit of various embodiments that the adapter provides a mechanical interface and may provide a replacement seal (in the form of its own seal), which prevents further leakage of fluid from the failing seal of the valve stem while also transmitting the desired actuating force from the actuator to the valve stem so that it continues to function in its originally intended manner. Since the interface adopts the conformal mechanical interfaces of the valve and its actuator, it can be interposed between the two as easily as the actuator can be mated to the valve in the first instance. As a result, time-consuming replacement of the failed seal on the valve stem can be avoided.

Should an adapter itself begin to fail in service, another like adapter may be inserted so as to be stacked on the first adapter, renewing the repair, or the failing adapter can simply be replaced by a new adapter.

These and other features and advantages of various embodiments of the invention are recited in more detail in the following.

BRIEF DESCRIPTION OF THE DRAWINGS

The foregoing and other features and advantages of the invention are apparent from the following detailed description taken in conjunction with the accompanying drawings, in which:

FIG. 6 is a perspective view of an embodiment of a transmission element.

FIG. 7 is a cross-sectional view of an embodiment adapter housing.

FIG. 8 is a cross-sectional view of the transmission element of FIG. 6 disposed within the adapter housing of FIG. 7.

DETAILED DESCRIPTION

Figure 1:
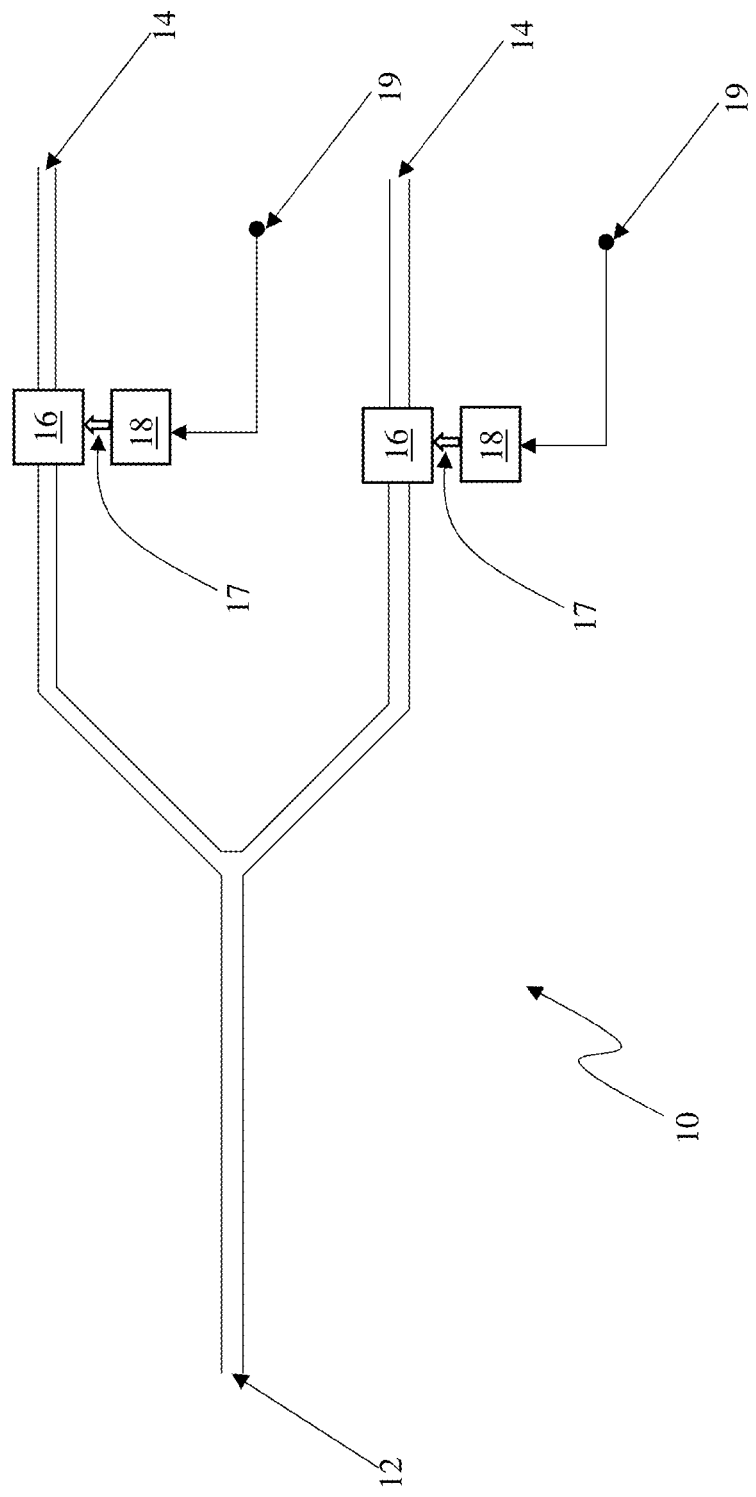
FIG. 1 is a schematic view of a conventional fluidic system incorporating valves and respective valve actuators.

FIG. 1 depicts a conventional fluidic system 10, as may be amenable in one embodiment to being serviced using an adapter as herein described. The features shown in FIG. 1 are generally representative of numerous types of controlled valves, including but not limited to valve assemblies provided by Honeywell, Siemens, Taco, Erie, Wilmar, etc. Such a system may include an input or first end 12 through which a fluid flows under pressure on its way to one or more output or second ends 14. The flow of fluid through each output end 14 may be controlled by a respective valve 16. The state of each valve 16 (e.g., open, closed, or some state therebetween) may be set and adjusted by a respective valve actuator 18, which may control its respective valve 16 based upon any suitable input signal 19, such as a sensor signal, timer signal, or the like. A mechanical interface 17 exists between each valve 16 and its respective actuator 18 that physically couples actuator 18 to its valve 16 and enables actuator 18 to exert an actuating force upon valve 16 to control the state of valve 16. Such actuating force may be, for example, a torque or linear force that turns or pushes/pulls a stem of valve 16. The actuator may be driven by mechanisms including, e.g., electrical drive, analog or digital/stepper, or may be hydraulic or pneumatic (driven vacuum or compressed air), a wax motor or the like, and may be normally open or normally closed.

Figure 2:
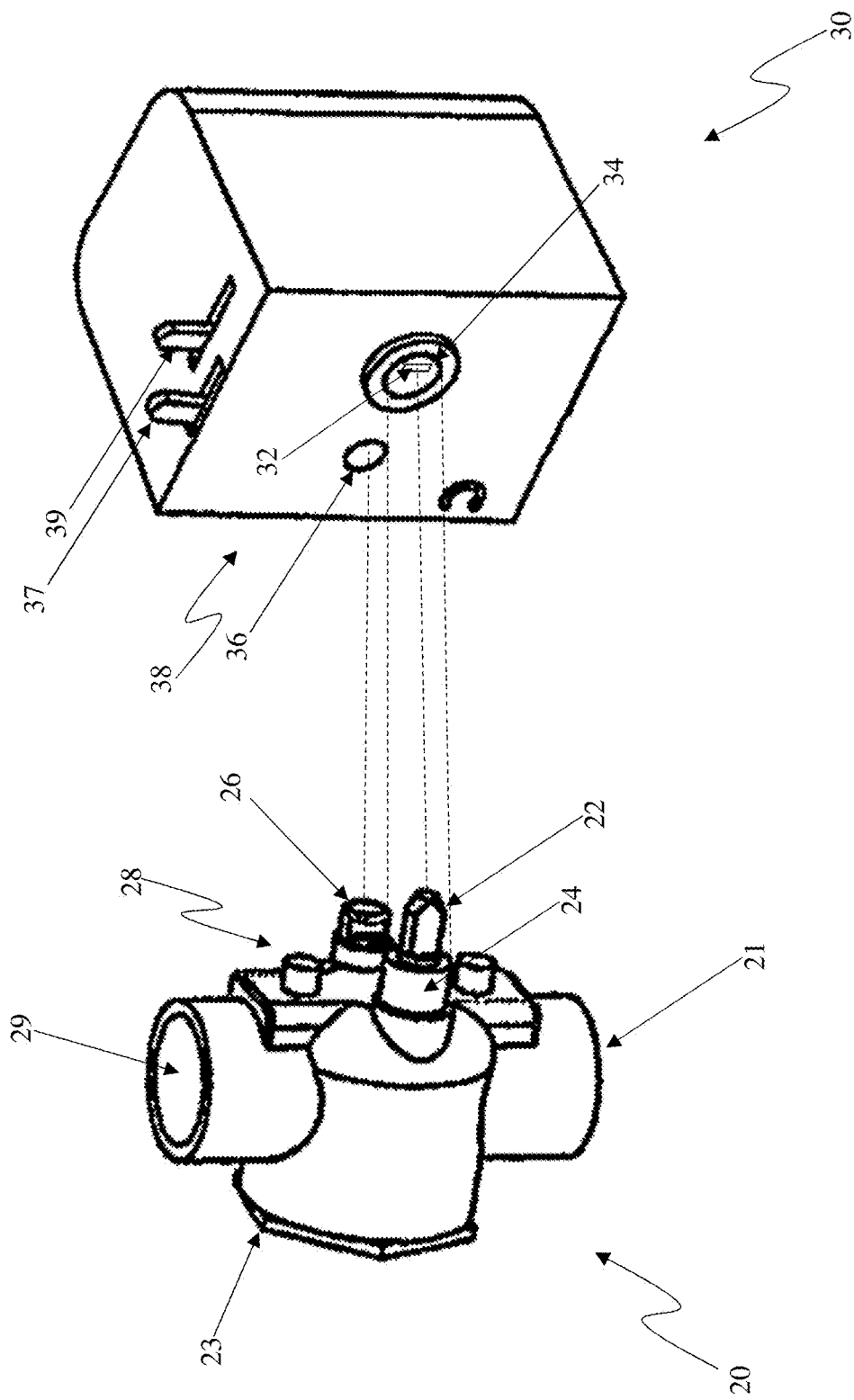
FIG. 2 is a perspective exploded view of an exemplary valve and its respective actuator.

With reference to FIG. 2, one example of a valve 20 and its corresponding valve actuator 30 is shown. It will be appreciated, however, that embodiments of the invention are not limited to the specific structures shown in the figures herein, which are merely illustrative.

In the exemplary embodiment, valve 20 includes an input end 21 and an output end 29. Flow of fluid from input end 21 to output end 29 is controlled by the position of valve stem 22 that, internally to valve 20, controls any suitable fluid-control device (not shown), as known in the art, e.g., a ball, flap or the like that may be selectively interposed between input end 21 and output end 29 based upon the position of stem 22. Stem 22 may thus be rotated (or linearly moved, for example, depending upon valve type) between an "off" position and an "on" position. Valve stem 22 extends from stem housing 24. Valve 20 will also typically include a secondary interface 26—or more than one such secondary interfaces 26, which are discussed below in connection with actuator 30. Collectively, valve stem 22, stem housing 24, and secondary interface(s) 26 comprise a mechanical interface 28 of valve 20.

Valve 20 typically will have a cover 23 that may be disassembled to access internal components of valve 20 for repair purposes and the like. Although not shown, valve 20 may also include a cap that may be affixed to the cover. Input end 21 and output end 29 are typically soldered into the fluidic assembly (not shown) as part of the installation.

Actuator 30 in the above-referenced exemplary embodiment includes a stem housing interface 34 conformal to stem housing 24, a stem interface 32 conformal to valve stem 22, and one or more secondary interfaces 36 conformal to secondary interface(s) 26 of valve 20. Collectively, stem interface 32, stem housing interface 34, and secondary interface(s) 36 comprise a mechanical interface 38 of actuator 30. Each interface 32, 34, 36 on actuator 30 mechanically mates with its corresponding interface 22, 24, 26 on valve 20, thus providing the requisite conformal mechanical interface between the two interfaces 28, 38; that is, the mechanical interface 38 of actuator 30 is designed to be conformal to the mechanical interface 28 on valve 20. Although not shown, actuator 30 includes a motor or the like (as discussed earlier) that rotatably (or, e.g., linearly) drives stem interface 32 so as to correspondingly drive stem 22 of valve 20, and thus a valve-controlling torque (or linear force) is transmitted from actuator 30 to valve 20 to correspondingly control the flow of fluid from input end 21 to output end 29 of valve 20. Hence, the conformal mechanical interface 38 on actuator 30 allows actuator 30 to impart an actuating force to valve 20 so as to adjust the fluid-control state of valve 20. The position of valve stem 22 may also be manually controlled via a lever 39 or the like on actuator 30.

Secondary interface 36 of actuator 30 couples to secondary interface 26 of valve 20, typically by way of a latching mechanism so as to releasably connect secondary interfaces 26, 36 to each other. A latch-release mechanism 37 on actuator 30 may be used to uncouple secondary interfaces 26, 36 from each other, such as by releasing a tongue in secondary interface 36 from a groove in secondary interface 26, or the like. Secondary interfaces 26, 36 not only provide a secondary means of mechanically coupling valve 20 to actuator 30 (in addition to the coupling proved by the valve housing 24, 34 and valve stem 22, 32 interfaces) but also help to prevent corotation between valve 20 and actuator 30 when torque is transmitted between the two.

Mechanical interfacing between a valve and its actuator are used in numerous fields. For example, a zone control valve in an HVAC system may be actuated by an electromechanical actuator, substantially as described above. Because the valve operates upon a fluid and the actuation input is operated externally to the valve (that is, via the valve stem), the actuation input (e.g., the valve stem or rotation shaft) may have a seal to prevent leakage or escape of the fluid. For example, O-rings may be disposed around the valve stem or shaft, and these O-rings abut the interior wall of the valve stem or shaft housing, thereby providing a fluid-tight seal between the valve stem and its stem housing. Many other sealing arrangements may be encountered, as known in the art. A problem arises, however, when such a seal begins to fail, for when it does fluid will begin escaping from around the valve stem and leak into the external environment, including into the actuator, which may potentially damage the actuator above and beyond compromising the integrity of the fluidic system as a whole.

Replacing the seal, since it is within the interior of the valve, will often require removing the actuator from the valve (which is generally relatively easy to do via the existing release mechanism between the mechanical interfaces) and then disassembling the valve. This, in turn, requires that the fluidic system at least within the region of the malfunctioning valve by stopped (e.g., depressurized), such as by way of another valve upstream to the leaking valve or by shutting down the fluidic system entirely. This can be disruptive, inconvenient, or both due to the releasing of pressure and/or fluids, admitting air and/or contaminants, or disassembly and reassembly of valve components, which are not infrequently positioned in inconvenient locations that makes accessing the valve highly time-consuming, tedious, or both in the first instance. Replacing the entire valve/actuator assembly is likewise relatively costly, time-consuming, and potentially also vulnerable to operational complications.

To overcome these and other issues, an embodiment adapter may be applied, instead of repairing or replacing a leaking valve. The adapter may be applied by interposing it between the leaking valve and the actuator, which both prevents further leaking from the valve while also allowing the actuator to control the valve via the actuating force.

Figure 3:
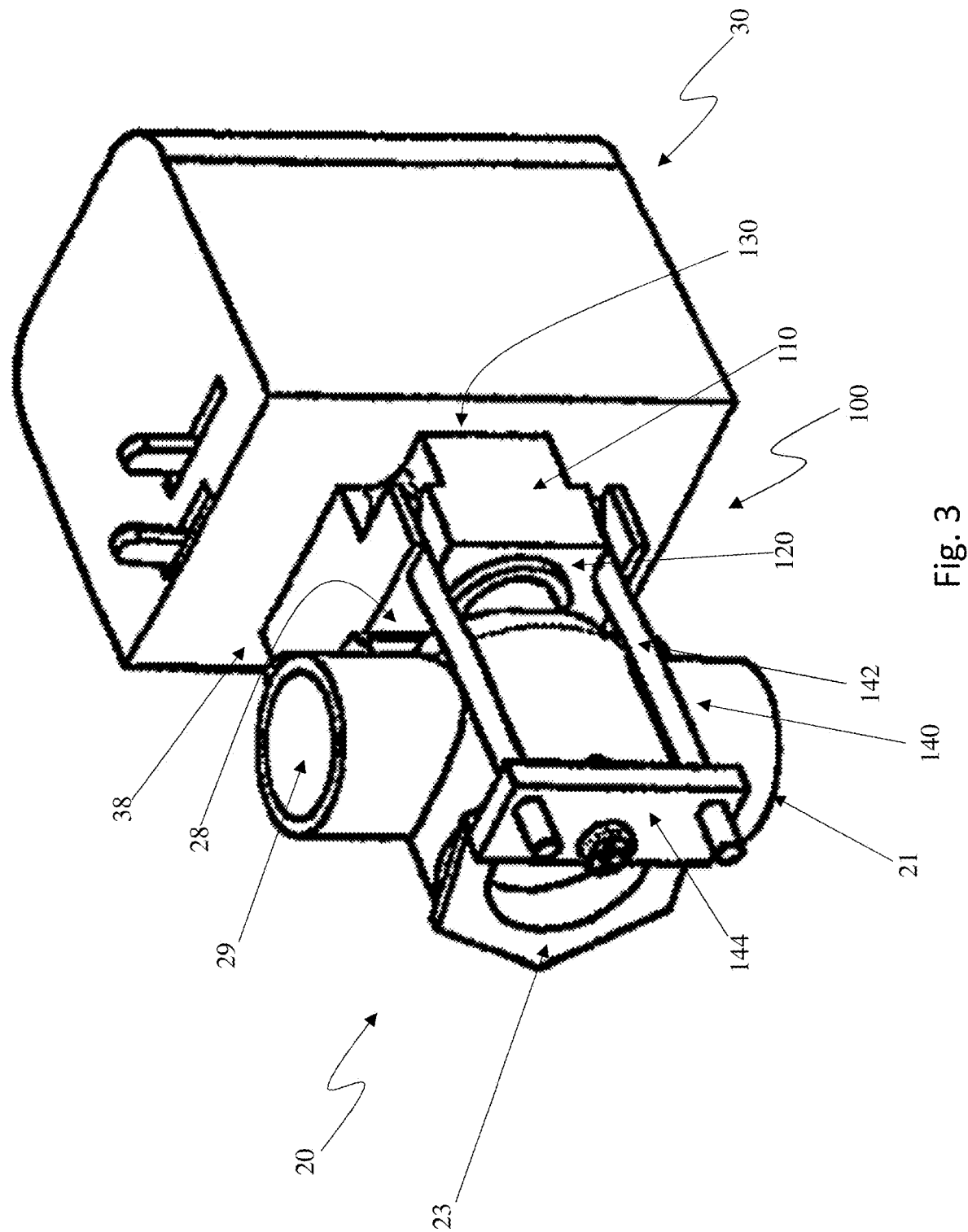
FIG. 3 is a perspective view of an embodiment adapter interposed between a conventional valve and valve actuator.

FIG. 3 illustrates an embodiment of such an adapter, adapter 100. Adapter 100 may be interposed between the conventional valve 20 and the conventional actuator 30 for valve 20 discussed earlier. Of course, adapters for other types of valve/actuator pairs may also be provided in accordance with the principles disclosed herein. Valve 20 and actuator 30 may thus be any type of valve/actuator pair. The following description is simply with reference to one specific type of valve 20/actuator 30 pair for illustrative purposes, but various embodiments of the invention are not limited to the specific pair discussed herein.

Valve 20 includes mechanical interface 28, and actuator 30 has corresponding mechanical interface 38. The mechanical interfaces 28, 38 are configured to engage with each other so that valve 20 can be controlled by an actuating force generated by actuator 30, as previously discussed. However, instead of directly coupling valve 20 to actuator 30 via their respective interfaces 28, 38, adapter 100 is mechanically interposed between valve 20 and actuator 30, and transmits the actuating force generated by actuator 30 to valve 20.

Adapter 100 includes a first mechanical interface 120 that is configured to engage with mechanical interface 28 of valve 20. The design of first mechanical interface 120 of adapter 100 is thus functionally similar, and may have a similar surface contour, to the design of mechanical interface 38 of actuator 30. Similarly, adapter 100 includes a second mechanical interface 130 that is configured to engage with mechanical interface 38 of actuator 30. The design of second mechanical interface 130 of adapter 100 is functionally similar, and may have a similar surface contour, to the design of mechanical interface 28 of valve 20. First mechanical interface 120 of adapter 100 is directly coupled to mechanical interface 28 of valve 20, and second mechanical interface 130 of adapter 100 is directly coupled to mechanical interface 38 of actuator 30, thereby mechanically interposing adapter 100 between valve 20 and actuator 30. In addition to securing provided by the mechanical interfaces 28, 38, the respective components (e.g., valve 20, adapter 100, and actuator 30) may be further secured to each other by any suitable means, such as via screws arrayed around or on the respective interfaces, clasps, latches, or the like.

Due to leaking of valve 20, fluid pressure may develop between adapter 100 and valve 20 that will tend to force adapter 100 away from valve 20. Although mechanical interface 28 of valve 20 will typically include a secondary interface to releasably connect to a corresponding secondary interface (e.g., on mechanical interfaces 38, 120), this secondary interface may be insufficient for the potential pressures that may build between the mechanical interfaces 28, 120 from leaking valve 20. Additionally, since this pressure will typically originate from around the valve stem of valve 20, and as the secondary interface is to a side of the valve stem, a torque may develop around the secondary interface that generates an unbalanced force on or across the valve stem. This may be increased by rocking or vibrational forces and the further leverage resulting from lengthening the valve-actuator assembly by the thickness of adapter 100, and weakened by the additional mechanical interface introduced by the insertion of adapter 100. To counter the added pressure and leverage, and the unbalanced forces that they may generate, as well as the additional flex in the combined interfaces, adapter 100 may further include a secondary connector 140 that is used to releasably fix adapter 100 to valve 20. Secondary connector 140 is preferably used in addition to the secondary interface, and, moreover, is preferably disposed on a side of the valve stem that is opposite the secondary interface.

Any suitable mechanism may be used for secondary connector 140. For example, secondary connector 140 may include one or more connectors or shafts 142 coupled to and extending from a body or housing 110 of adapter 100. Connectors or shafts 142 are further coupled (for example, threadedly coupled for easy disassembly) to a plate 144, in which plate 144 abuts against an end of valve 20 opposite the end comprising the valve stem and, as a result of tension developed by shafts 142, biases valve 20 towards first mechanical interface 120 of adapter 100. However, it will be appreciated that any sort of releasable connection may be used for secondary connector 140, such as latches, bolts extending through or into the body of valve 20, etc., variations of which are discussed later.

Figure 4:
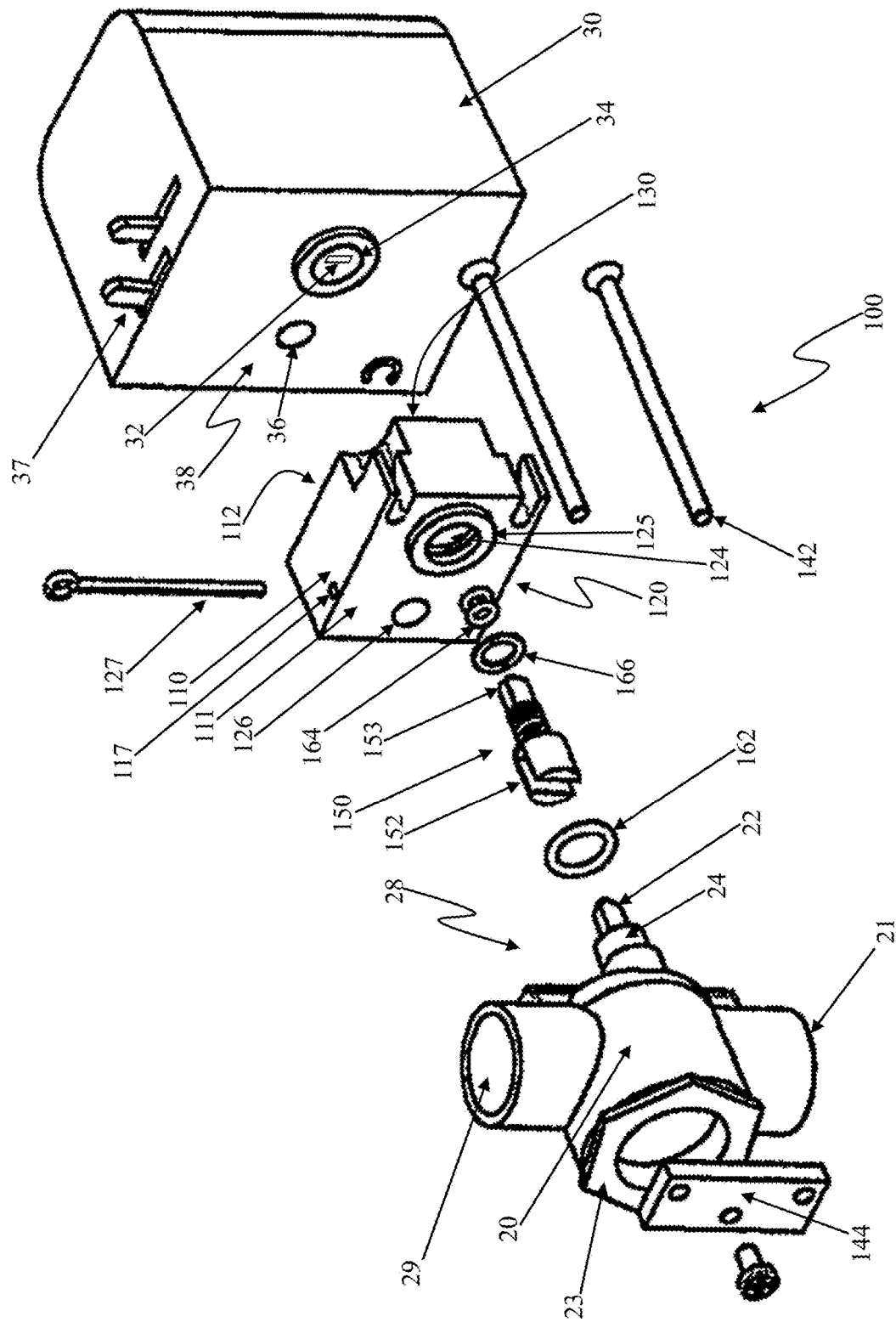
FIG. 4 is a perspective exploded view of the adapter, valve, and valve actuator shown in FIG. 3.
Figure 5:
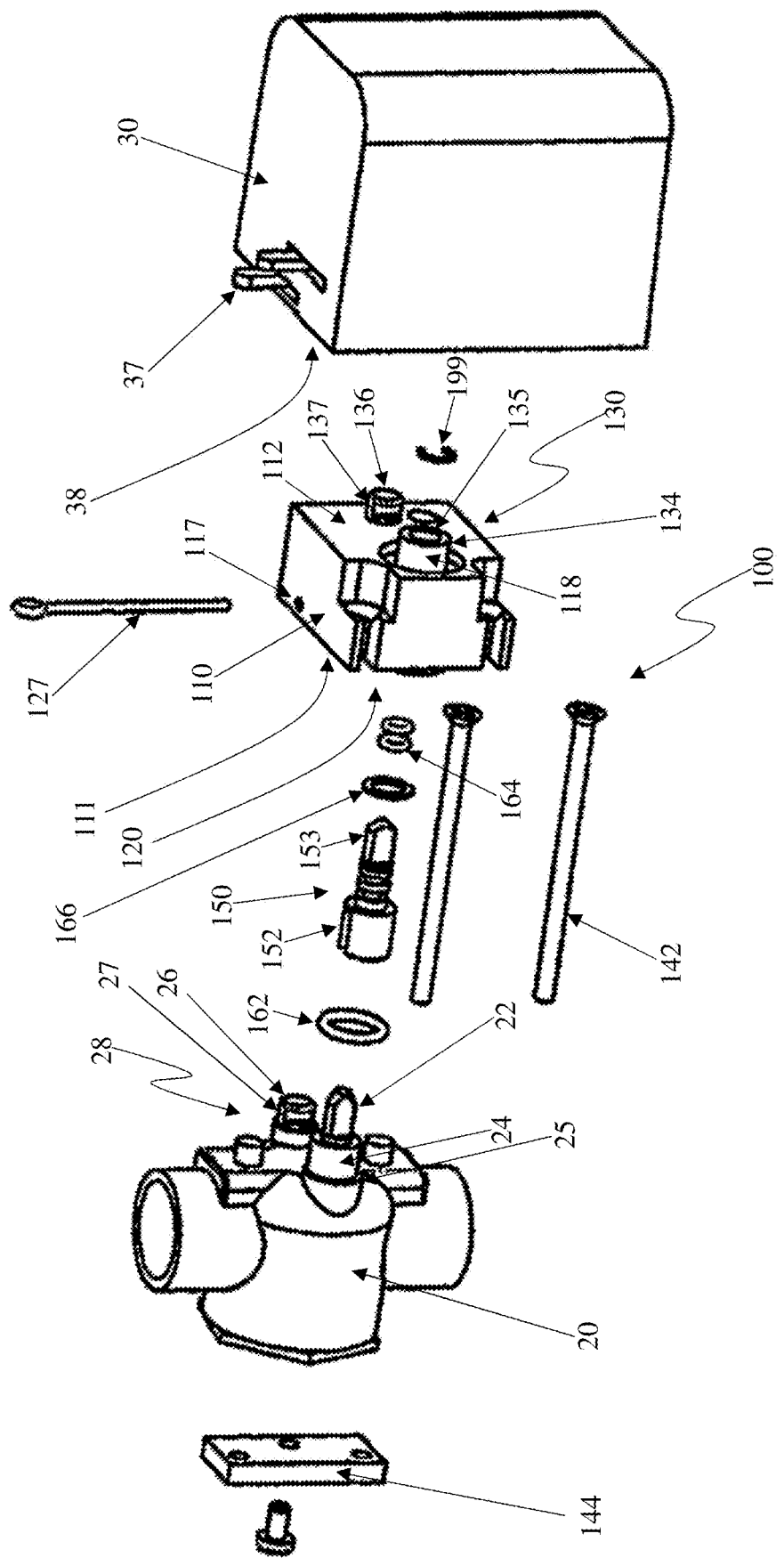
FIG. 5 is another perspective exploded view of the adapter, valve, and valve actuator shown in FIG. 3.

FIGS. 4 and 5 are perspective exploded views of adapter 100, valve 20, and valve actuator 30 shown in FIG. 3. In addition to secondary connector 140 and housing 110, adapter 100 includes a transmission element 150 that transmits the actuating force developed by actuator 30 from the second mechanical interface 130 to the first mechanical interface 120, and hence to valve 20 via, for example, valve stem 22.

Transmission element 150 may be, for example, a shaft that extends through housing 110 and is suitably sealed with the interior of housing 110 to prevent movement of fluid through housing 110. A first end 152 of transmission element 150 is configured to interface with valve stem 22 of valve 20 and thus forms part of first mechanical interface 120 of adapter 100. For example, with respect to the specific embodiments shown in FIGS. 4 and 5, first end 152 of transmission element 150 may be a slot that has a shape configured to mate with a distal end (e.g., a tongue) of valve stem 22. Of course, other configurations are possible depending upon the specific type of valve/actuator pair in use. Generally, however, first end 152 of transmission element 150 may correspond to (e.g., functionally mimic) the actuation or stem interface 32 of actuator 30.

A second end 153 of transmission element 150 is configured to interface with stem interface 32 of actuator 30 and thus forms part of second mechanical interface 130 of adapter 100. For example, with respect to the specific embodiments shown in FIGS. 4 and 5, second end 153 of transmission element 150 may be a tongue that has a shape configured to mate with a slot (or other receiving structure) of stem interface 32. As before, it will be appreciated that other configurations are possible depending upon the specific type of valve/actuator pair in use, but generally second end 153 of transmission element 150 may correspond to (e.g., functionally mimic) stem 22 of valve 20.

Adapter 100 may also include a first secondary interface and a second secondary interface corresponding to secondary interface 26 of valve 20 and secondary interface 36 of actuator 30, respectively. For example, a first face 111 of adapter 100 may include an opening 126 that corresponds to, and is adapted to mate with, secondary interface 26 of valve 20. Additionally, if secondary interface 26 includes aspects of a latching mechanism, such as a notch 27 or the like, then adapter 100 may include a corresponding latching mechanism 127 in coordination with opening 126 to engage with latching mechanism 27 on valve 20. For example, as shown in FIGS. 4 and 5, in one embodiment the corresponding latching mechanism 127 may include a pin or the like (which may, for example, be threaded) that extends through an opening 117 transverse to, and in communication with, opening 126. When secondary interface 26 of valve 20 is engaged with opening 126, latching mechanism 127 may be inserted into opening 117 to engage with notch 27 and thus lock secondary interface 26 with housing 110. The corresponding mating structures 126, 127 thus provide a first secondary interface for first mechanical interface 120 of adapter 100 that correspond to secondary interface(s) 26 of valve 20, and which, functionally, mimics secondary interface(s) 36 on actuator 30. Hence, it will be appreciated that instead of employing a pin as latching mechanism 127, other embodiments could employ substantially the same latch-release mechanism 37 used in actuator 30 to achieve suitable functional mimicry.

Similarly, a second face 112 of adapter 100 may include, for example, an extension 136 that corresponds to, and is adapted to mate with, an opening provided by secondary interface 36 of actuator 30. Additionally, if secondary interface 36 includes aspects of a latching mechanism, such as a latch-release mechanism 37 or the like, then adapter 100 may include a corresponding latching mechanism 137 in coordination with extension 136 to engage with latch-release mechanism 37 of actuator 30. For example, as shown in FIGS. 4 and 5, in one embodiment the corresponding latching mechanism 137 may include a notch in extension 136 that is configured to interface with the associated structure of latch-release mechanism 37 (e.g., engage with a tongue or the like). When secondary interface 36 of actuator 30 is engaged with extension 136, a tongue of latch-release mechanism 137 may engage notch 137 and thus lock secondary interface 36 with housing 110. The corresponding mating structures 136, 137 thus provide a second secondary interface for second mechanical interface 130 of adapter 100 that correspond to secondary interface(s) 36 of actuator 30, and which, functionally, mimics secondary interface(s) 26 on valve 20.

In various embodiments it is preferred that first mechanical interface 120 of adapter 100 provide a fluid-tight seal with respect to at least a portion of mechanical interface 28 of valve 20. For example, internal failures within valve 20 may cause fluid to leak from valve stem 22—or, more precisely, from the space between valve stem 22 and the internal surface of stem housing 24 within which stem 22 is movably (e.g., rotatably) disposed and extends from. In such failure modes, it is thus preferable that when adapter 100 is attached to valve 20, first mechanical interface 120 prevents further leakage of fluid from valve stem 22 into the environment, including, for example, into actuator 30, while allowing the actuating force to be transmitted from actuator 30 to valve 20.

Any suitable sealing means may be used to provide such fluid-tight sealing between the mechanical interfaces 28, 120 that prevent further leaking from valve 20 into the environment. By way of example, with respect to the specific embodiment shown in FIGS. 4 and 5, the sealing mechanism may include one or more first O-rings 162 that prevent egress of fluid out of body 110 from first face 111 of adapter 100. The sealing mechanism may also include one or more second O-rings 164 that prevent egress of fluid out of body 110 from second face 112 of adapter 100. The sealing mechanism may further include a third O-ring 166 to prevent fluid from traversing from first mechanical interface 120 to second mechanical interface 130—that is, from traversing internally within housing 110 from first side 111 to second side 112.

With further reference to FIGS. 6-8, in one specific sealing arrangement, transmission element 150 may include a first shaft 151 associated with first end 152 of transmission element 150 for first mechanical interface 120. Transmission element 150 may further include a second shaft 157 connected to first shaft 151 and associated with second end 153 of transmission element 150 for second mechanical interface 130. Second shaft 157 may include grooves 156 within which second O-rings 164 are seated. First shaft 151 may have a diameter that is larger than the diameter of second shaft 157, and thus a step 154 is defined at the intersection of first shaft 151 with second shaft 157. Third O-ring 166 may be disposed around second shaft 157 and abut step 154.

Adapter housing 110 may include a through hole 113 extending from first face 111 to second face 112 within which transmission element 150 is at least partially movably (e.g., rotatably) disposed. Through hole 113 may be conformal, at least in part, to the shape of transmission element 150 to facilitate fluid-tight sealing between transmission element 150 and housing 110. For example, with reference to the specific embodiment discussed above, through hole 113 may include a first opening 124 extending from first face 111 towards second face 112 and having a diameter conformal to stem housing 24 of valve 20. First opening 124 may include a notch or recess 122 within which first O-ring 162 is disposed. Through hole 113, however, further includes a second opening 134 extending from second face 112 to first through hole 124 and having a diameter conformal to the diameter of second shaft 157 of transmission element 150. As a result, a step 114 is defined at the intersection of first opening 12 and second opening 134. Second opening 134 may pass through an extension 118 on second face 112 that mimics valve housing 24 and thus serves as part of the second mechanical interface 130.

When transmission element 150 is disposed within through hole 113, the one or more second O-rings 164 are sandwiched between the surface defining second opening 134 and the surface of the grooves 156 in second shaft 157, thus forming a fluid-tight seal between second shaft 157 and housing 110 that prevents any fluid in through hole 113 from exiting second face 112. Additionally, third O-ring 166 is sandwiched between step 154 of transmission element 150 and step 114 of through hole 113, thus preventing transit of any fluid in through hole 113 on the side corresponding face 111 to the side corresponding to face 112. Moreover, when first mechanical interface 120 of adapter 100 mates with mechanical interface 28 of valve 20, the distal end of stem 22 mates with the proximal end of first shaft 151 to facilitate transmission of the actuator force to stem 22 and stem housing 24 is inserted into first through hole 124 and abuts against first O-ring 162, thereby sandwiching first O-ring 162 between stem housing 24 and the surface defining first opening 124, thereby providing a fluid tight seal between stem housing 24 and adapter housing 110. As a result, any fluid leaking from stem 122 is unable to exit from first face 111, and is further prevented from exiting from second face 112 due to, in turn, third O-ring 166 and second O-rings 164. Consequently, despite suffering from a malfunction that causes leaking, no liquid escapes from valve 20 into the surrounding environment (including into actuator 30) when first mechanical interface 120 of adapter 100 is mated to mechanical interface 28 of valve 20.

To further facilitate fluidic sealing and mechanical interfacing between adapter 100 and valve 20, first face 111 of adapter 100 may include a thrust washer 125 or the like (e.g., a gasket) that is disposed around first opening 124. Thrust washer 125 may be made of any suitable material, and in certain embodiments may be made from or comprise polytetrafluoroethylene (Teflon®). Thrust washer 125 mates against a corresponding surface 25 on or around stem housing 24 to provide yet an additional barrier against the egress of fluid leaking from or around valve stem 22. It will be appreciated that other means may be used to fluidically seal the interface on and around stem housing 24 and the corresponding surfaces on first mechanical interface 120 of adapter 100, such as gaskets, sealants, etc.

In various embodiments, housing 110 of adapter 100 and related subcomponents, such as transmission element 150, are preferably made from materials similar to and/or compatible with those of the valve body (e.g., stem housing 24) and the valve stem/shaft 22, e.g., of brass and steel, respectively. Adapter 100 body may be cast, forged, machined, 3d printed, or fabricated by a combination thereof. Materials may be selected to inhibit corrosion and/or bimetallic electrolysis. For example, housing 110 may be made entirely from brass (or another suitable metal), or may be made from brass (or other suitable metal) surrounded by other materials, such as another type of metal (e.g., aluminum) or plastic (preferably plastic capable of withstanding the related pressures and temperatures), or the like.

Adapters may be provided separately as after-market items or sold with valves, actuators, or valve/actuator combinations, or as accessories. As part of a related kit, additional components that are readily lost may also be provided, such as additional secondary connectors 140, and C-rings 199 that are used to secure valve stem 22 and which may similarly be used to secure transmission element 150. Such C-rings 199 may further include an extension with a hole that may be used to engage with an awl or the like to facilitate snapping of C-ring 199 onto its related shaft.

Figure 9:
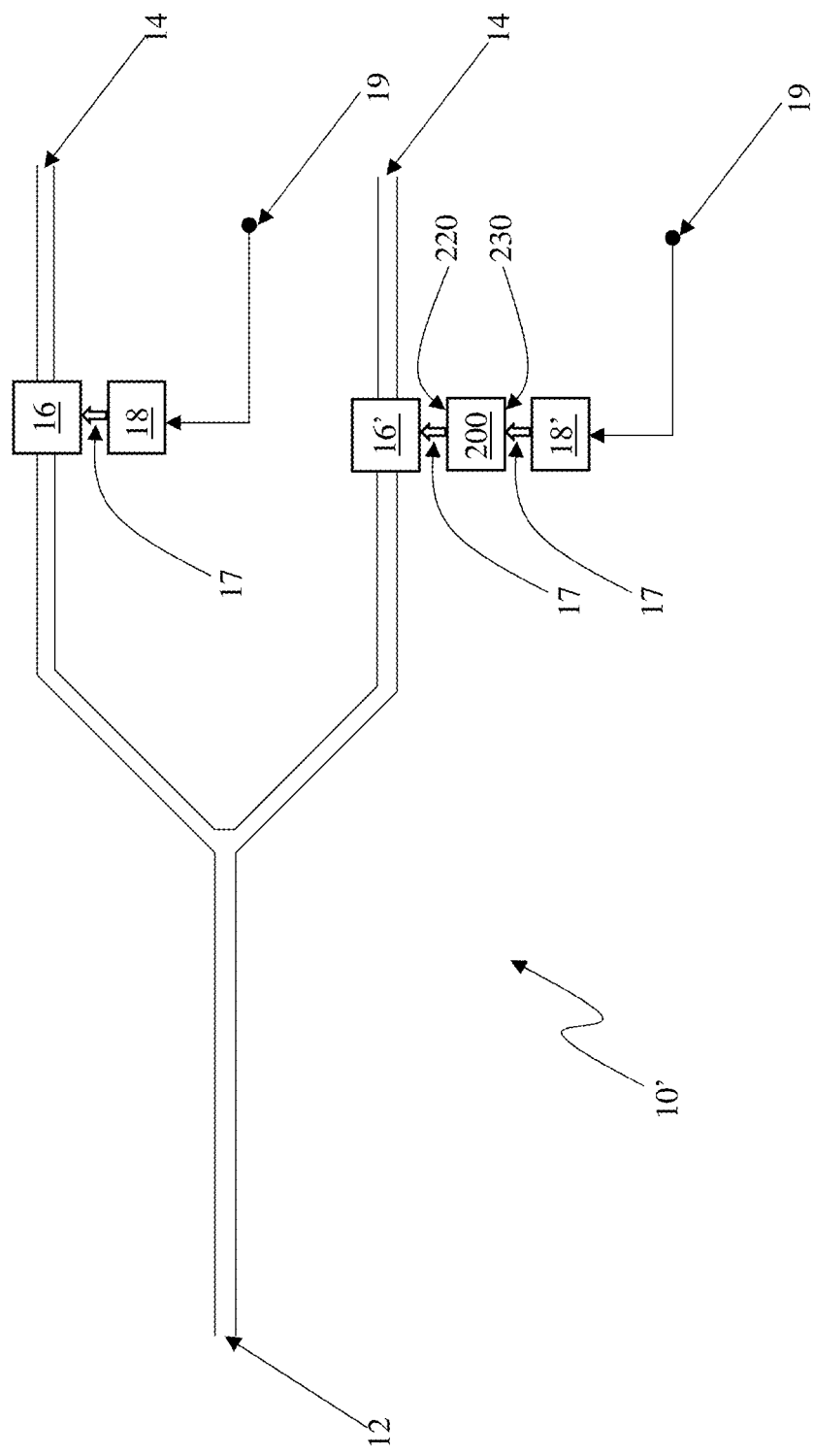
FIG. 9 is a schematic view illustrating a system utilizing an embodiment adapter to address a leaking valve.

Referring to FIG. 9, a system 10 includes an input end 12 and one or more output ends 14, in which fluid under pressure, such as water (although any fluid may do), flows from input end 12 to output ends 14 via one or more valves 16. Routine inspection reveals that valve 16' is leaking, and in particular is exhibiting a common failure mode in which fluid (such as water) leaks from between the valve stem and the valve stem housing. Typically, to address such leakage, valve 16' would need to be either replaced or repaired, both of which entail considerable time and effort. Instead, an embodiment adapter 200 is employed. Actuator 18' is disconnected from valve 16', and adapter 200, via first mechanical interface 220 thereof, is mated to valve 16'. Thereafter, actuator 18' is mated to adapter 200 via second mechanical interface 230. Actuating force 17 developed by actuator 18' in response, for example, to a signal 19, is transmitted to adapter 200 which, in turn, transmits actuating force 17 to valve 16' via the internal transmission element of adapter 200. Since first mechanical interface 220 forms a fluid-tight seal with respect to the leaking components (e.g., valve stem and related stem housing) of valve 16', further escape of fluid from system 10 is prevented, despite the fact that valve 16' continues to suffer from its original failure mode. System 10 is thus substantially repaired and may continue normal operations, despite valve 16' otherwise suffering from leaking from its valve stem-which leakage is prevented by adapter 200. Such repair is quick and easy, utilizing nothing more than the existing connect/disconnect features of the original valve/actuator pair.

Figure 10:
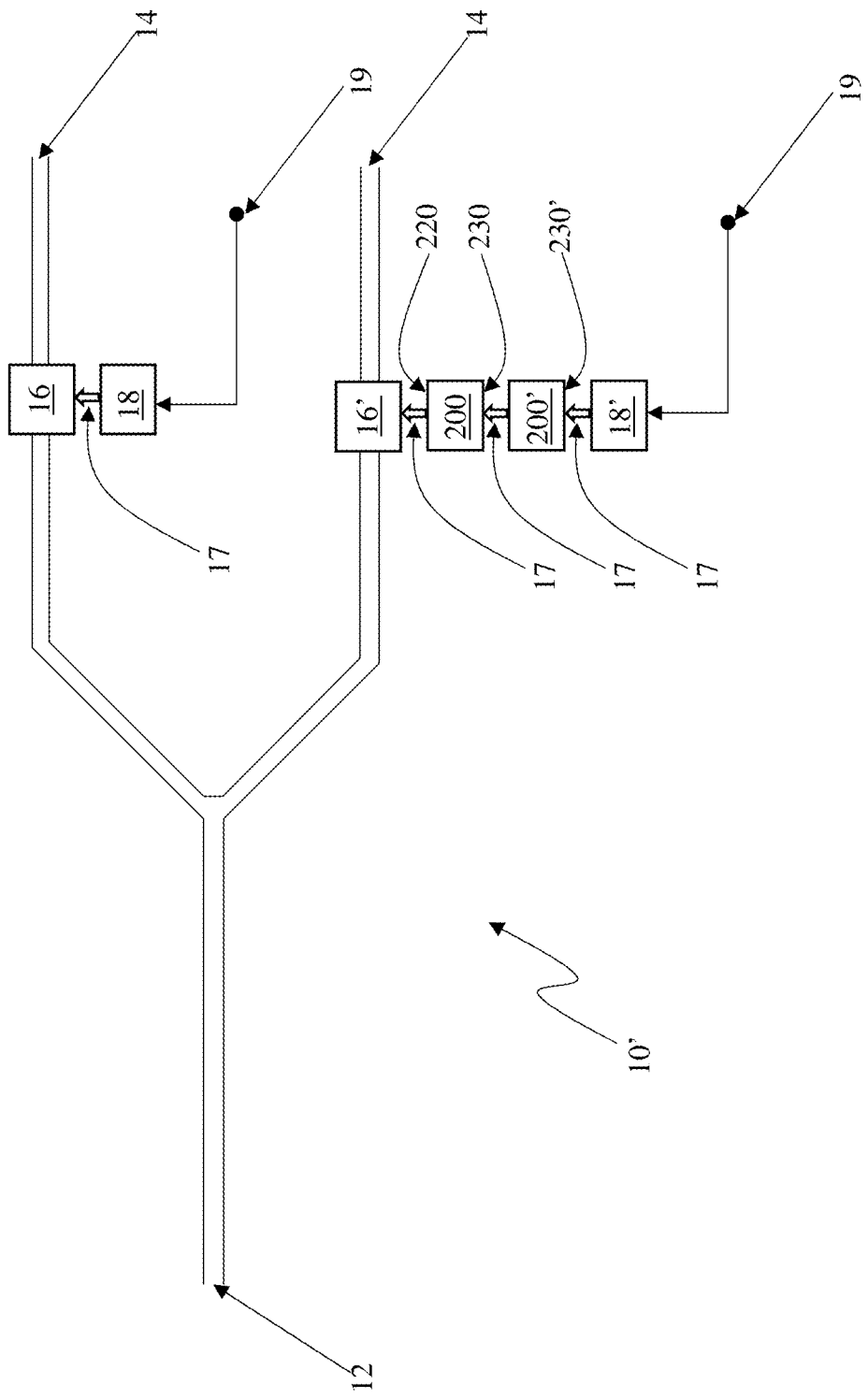
FIG. 10 is a schematic view illustrating a system utilizing stacking of embodiment adapters.

Because of the complementary characteristics of the mating surfaces of the valve body, adapter, and actuator, and similar complementation characteristics of the drive interfaces for the actuation input of the valve and for the extender shaft of the adapter, adapters may be "stacked." This is schematically illustrated in FIG. 10, which builds upon the hypothetical system illustrated in FIG. 9. In the event that embodiment adapter 200 fails in a manner analogous to failing valve 16'—that is, adapter 200 begins leaking from second mechanical interface 230—in addition to simply replacing adapter 200 with a new adapter 200', it is possible instead to chain new adapter 200' to adapter 200 to prevent further leaking of fluid from adapter 200. In this case, actuator 18' is disconnected from failing adapter 200. New adapter 200', via its first mechanical interface, is mated to second mechanical interface 230 of failing adapter 200, thereby in effect "plugging" the leak exhibited by adapter 200. Actuator 18' is then mated to second mechanical interface 230' of new adapter 200'. Actuating force 17 generated by actuator 18' is transmitted to new adapter 200' which, in turn, transmits actuating force 17 to leaking (but now "plugged") adapter 200 that, finally, transmits actuating force 17 to failing (though, again, "plugged") valve 16'. It will be appreciated that embodiment adapters may be multiply stacked in this manner.

Figure 11:
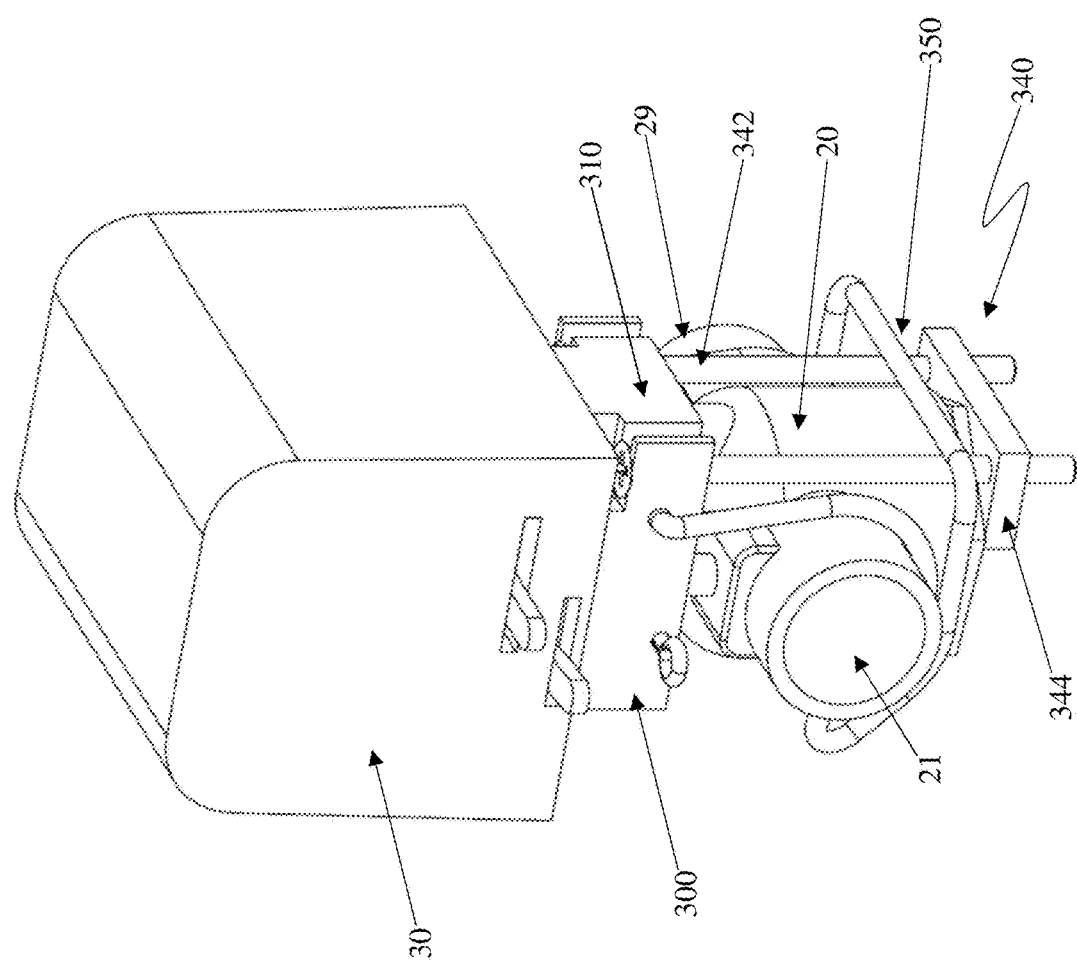
FIG. 11 is a perspective view illustrating another embodiment adapter to address a leaking valve.
Figure 12:
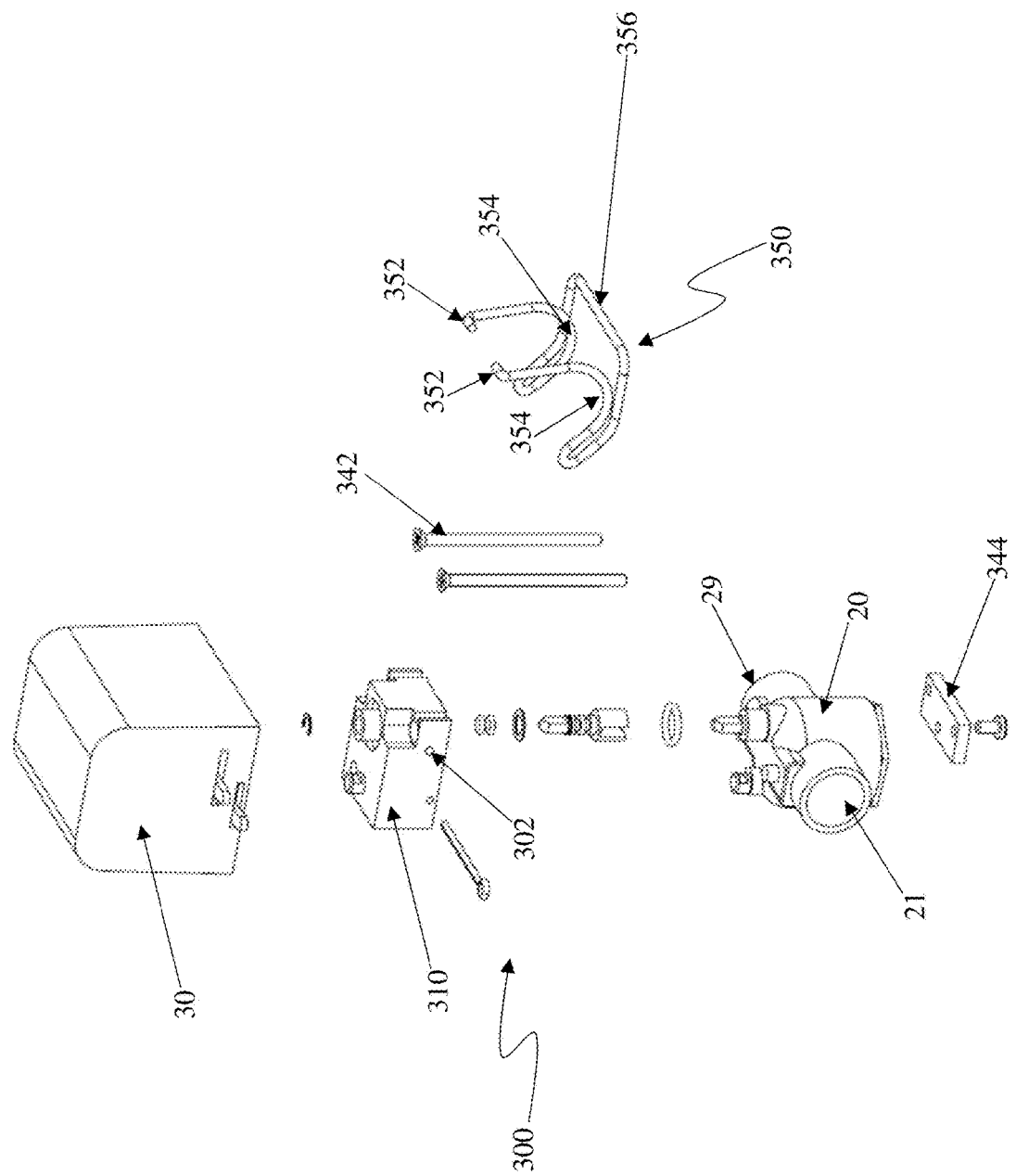
FIG. 12 is an exploded view of the embodiment adapter of FIG. 11.

FIGS. 11 and 12 depict a second embodiment adapter 300 that may be interposed between conventional valve 20 and conventional actuator 30 for valve 20. Adapter 300 is substantially similar to adapter 100 and hence many features common to adapter 300 and adapter 100 are not discussed. Adapter 300, however, includes a secondary connector 340 that is augmented from secondary connector 140 of the prior embodiment adapter 100.

As with embodiment adapter 100, secondary connector 340 includes a first connecting portion comprising one or more connectors or shafts 342 (such as screws) coupled to and extending from body or housing 310 of adapter 300, such as by way of extending through respective openings in body 310. Connectors or shafts 342 are further coupled (for example, threadedly coupled) to a plate 344, in which plate 344 abuts against an end of valve 20 opposite the end comprising the valve stem and, as a result of tension developed by shafts 342, biases valve 20 towards the first mechanical interface of adapter 300.

Secondary connector 340, however, further includes a second connecting portion 350 that biases valve 20 towards the first mechanical interface of adapter 300 by way of an elastic snap-fit connection. Second connecting portion 350 may be made from any suitable elastic material, such as steel, plastic, or the like. Second connecting portion 350 is pivotably coupled to holes or depressions 302 in housing 310 by way of respective arms 352. Extending from each arm 352 is a concave bend 354, and the bends 354 are configured to respectively engage with the input end 21 and output end 29 of valve 20. In particular, bends 354 are respectively shaped so as to be substantially conformal to input end 21 and output end 29 so that when second connecting portion 350 is pivoted towards valve 20, bends 354 elastically engage with the input and output ends 21, 29 to provide a snap-fit connection with valve 20. This snap-fit connection causes bends 354 to pull upon arms 352 and thus biases valve 20 and adapter 300 towards each other. Bends 354 may be coupled together by a base arm 356. Hence, second connecting portion 350 may be formed from a single, continuous strand of elastic material.

Figure 13:
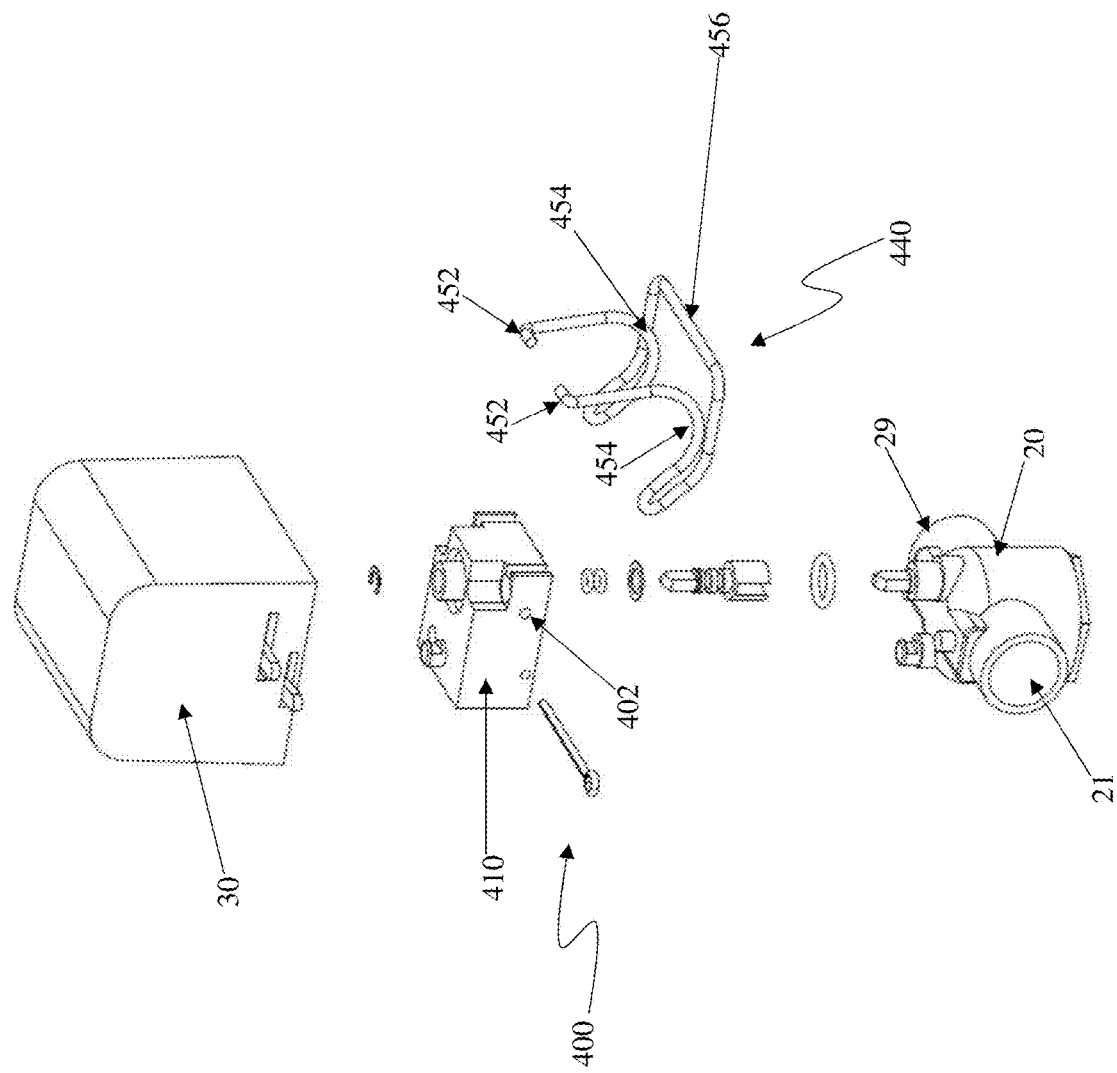
FIG. 13 is an exploded view illustrating another embodiment adapter to address a leaking valve.
Figure 14:
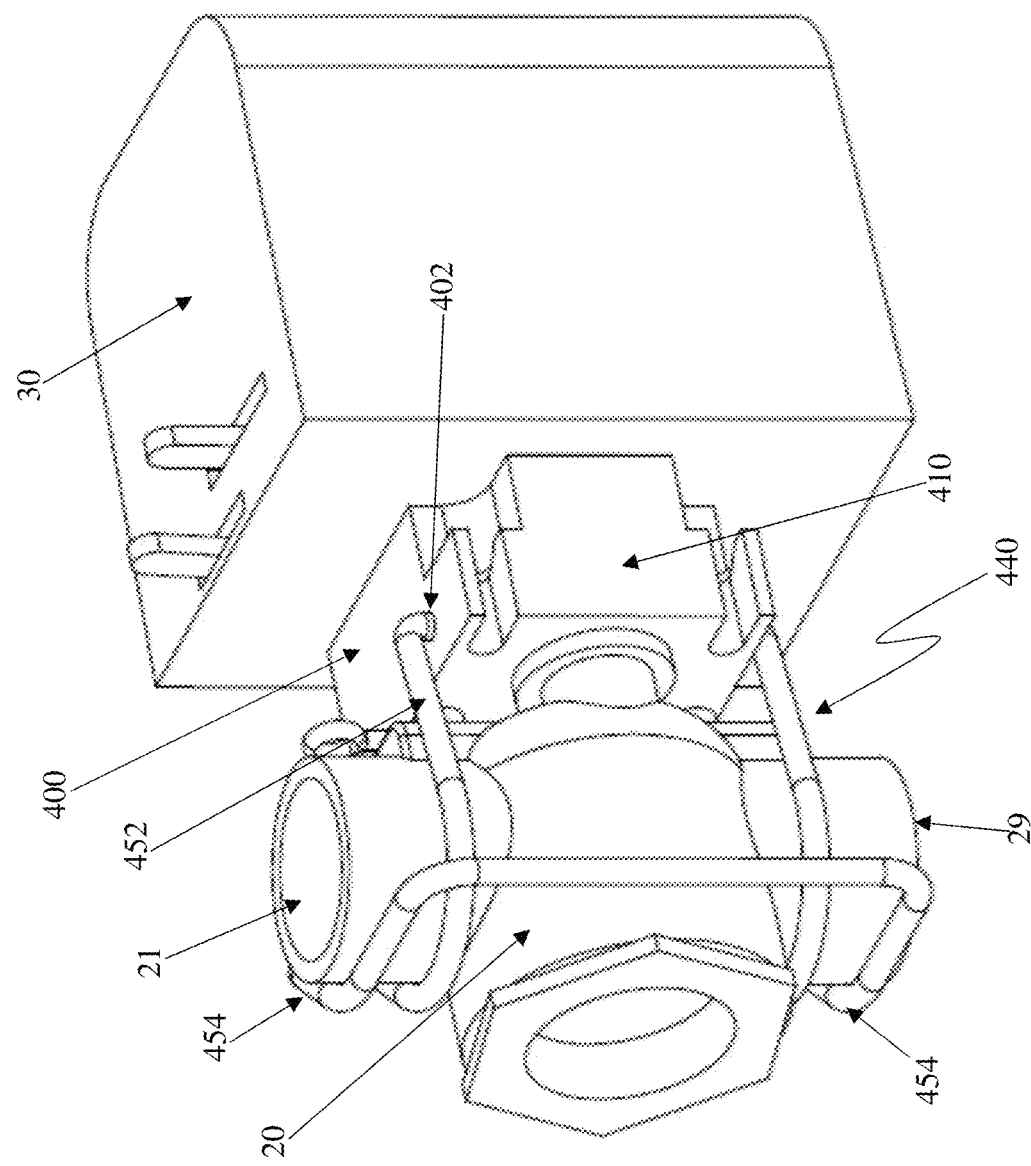
FIG. 14 is a perspective view of the embodiment adapter of FIG. 13.

As shown in FIGS. 13 and 14, another embodiment adapter 400 includes only a single secondary connector 440, which is substantially similar to second connecting portion 350 discussed above. Secondary connector 440 biases valve 20 towards the first mechanical interface of adapter 400 by way of an elastic snap-fit connection and may be made from any suitable elastic material, such as steel, plastic, or the like. Secondary connector 440 is pivotably coupled to holes or depressions 402 in housing 410 by way of respective arms 452. Extending from each arm 452 is a concave bend 454, and the bends 454 are configured to respectively engage with the input end 21 and output end 29 of valve 20, in which bends 454 are respectively shaped so as to be substantially conformal to input end 21 and output end 29. Hence, when secondary connector 440 is pivoted towards valve 20, bends 454 elastically engage with the input and output ends 21, 29 to provide a snap-fit connection with valve 20 that causes bends 454 to pull upon arms 452 and thus bias valve 20 and adapter 400 towards each other. Bends 454 may be coupled together by a base arm 456. Hence, secondary connector 440 may be formed from a single, continuous strand of elastic material.

The adapters described herein are not limited to use with valves. Other fluidic controls, for fluids including liquids, gasses, slurries, etc., or other mechanical devices with internal lubrication systems, may have seals on actuation controls or linkages that are likewise operated upon by external actuators, which would benefit in a similar manner from the availability of a corresponding adapter add-in to aid in servicing a failing seal. Such other systems might include electronically actuated mixers, aerators, injectors, gear shifters, and the like.

Although the invention has been described with respect to certain embodiments, it should be understood that the claims herein are not limited to such embodiments. The aspects of the invention in which exclusive rights are defined by the claims that follow. It should be noted that any reference numerals inserted in the claims are provided as examples of where the corresponding feature is reflected in the specification, and not intended to limit the claims to their corresponding disclosure in the specification. A person of ordinary skill in the art will recognize that certain features may be added, changed, or omitted without departing from the spirit and scope of the invention as defined by the claims.

I claim:

1. An adapter for coupling to a valve and to a valve actuator, the valve comprising a valve mechanical interface, the valve actuator comprising an actuator mechanical interface corresponding to the valve mechanical interface, the adapter comprising:
    a housing;
    a first mechanical interface on a first side of the housing configured to mechanically couple to the valve mechanical interface;
    a second mechanical interface on a second side of the housing configured to couple to the actuator mechanical interface and to accept an actuating force developed by the valve actuator and presented at the actuator mechanical interface;
    a transmission element at least partially disposed within the housing, the transmission element configured to transmit the actuating force at the second mechanical interface to a stem of the valve at the first mechanical interface; and
    a secondary connector configured to releasably bias together the adapter and the valve, the secondary connector comprising an elastic snap-fit connector pivotably coupled to the housing, the elastic snap-fit connector comprising an arm and a concave bend extending from the arm, the concave bend configured to elastically engage with the valve to provide a snap-fit connection that biases the valve and the adapter towards each other;
    wherein the second mechanical interface matably corresponds to the first mechanical interface.

2. The adapter of claim 1 wherein the first mechanical interface is configured to fluidically seal to at least a portion of the valve mechanical interface.

3. The adapter of claim 2 wherein the first mechanical interface is configured to fluidically seal against a stem housing of the valve.

4. The adapter of claim 1 further comprising at least one seal coupled to the transmission element to prevent egress of fluid from the housing.

5. The adapter of claim 4 wherein the at least one seal further prevents flow of fluid within the housing from the first side of the housing to the second side of the housing.

6. The adapter of claim 4 wherein the transmission element comprises a shaft extending through an opening in the housing from the first side to the second side, a first end of the shaft configured to interface with a valve stem of the valve, and a second end of the shaft configured to interface with a stem interface of the actuator.

7. The adapter of claim 1 wherein the first mechanical interface comprises an opening configured to accept an extension of the valve mechanical interface, the first mechanical interface further comprising a latching mechanism configured to releasably engage the extension of the valve mechanical interface.

8. The adapter of claim 7 wherein the second mechanical interface comprises an extension configured to mate with an opening in the actuator mechanical interface.

9. A method for preventing leakage of fluid in a fluidic system utilizing a first adapter of claim 1, the system comprising the valve, the valve leaking fluid from the valve mechanical interface, the system further comprising the valve actuator comprising the actuator mechanical interface, the actuator mechanical interface mechanically coupled to the valve mechanical interface to transmit the actuating force developed by the actuator to the valve, the method comprising:
    disconnecting the valve actuator from the valve;
    connecting the valve to the first side of the first adapter; and
    connecting the valve actuator to the second side of the first adapter.

10. The method of claim 9 further comprising:
    disconnecting the valve actuator from the second side of the first adapter;
    connecting the second side of the first adapter to a first side of a second adapter of claim 1; and
    connecting the valve actuator to a second side of the second adapter.

11. The method of claim 9 further comprising:
    utilizing the secondary connector to releasably bias together the first adapter and the valve.

* * * * *